United States Patent
Friman et al.

(10) Patent No.: US 11,928,184 B2
(45) Date of Patent: Mar. 12, 2024

(54) GENERATION OF A SECOND OBJECT MODEL BASED ON A FIRST OBJECT MODEL FOR USE IN OBJECT MATCHING

(71) Applicant: SICK IVP AB, Linköping (SE)

(72) Inventors: Ola Friman, Linköping (SE); Anders Moe, Linköping (SE); Kristoffer Öfjäll, Stenkullen (SE)

(73) Assignee: SICK IVP AB, Linköping (SE)

( * ) Notice: Subject to any disclaimer, the term of this patent is extended or adjusted under 35 U.S.C. 154(b) by 185 days.

(21) Appl. No.: 17/349,241

(22) Filed: Jun. 16, 2021

(65) Prior Publication Data
US 2021/0406583 A1    Dec. 30, 2021

(30) Foreign Application Priority Data

Jun. 30, 2020 (EP) .................................... 20183322

(51) Int. Cl.
*G06V 10/74* (2022.01)
*G06F 18/21* (2023.01)
(Continued)

(52) U.S. Cl.
CPC .......... *G06F 18/217* (2023.01); *G06F 18/214* (2023.01); *G06F 18/22* (2023.01);
(Continued)

(58) Field of Classification Search
CPC ...... G06F 18/217; G06F 18/214; G06F 18/22; G06F 18/2193; G06V 10/74; G06V 10/774; G06V 20/64
See application file for complete search history.

(56) References Cited

U.S. PATENT DOCUMENTS

| | | | | |
|---|---|---|---|---|
| 5,583,949 A | * | 12/1996 | Smith | ................ G06V 30/1823 |
| | | | | 382/199 |
| 7,869,657 B2 | * | 1/2011 | Podilchuk | ............ G06V 10/754 |
| | | | | 382/218 |

(Continued)

FOREIGN PATENT DOCUMENTS

| | | |
|---|---|---|
| JP | 2002304415 A | 10/2002 |
| JP | 2018165966 A | 10/2018 |

(Continued)

OTHER PUBLICATIONS

Biyi Fang: "Adaptive On-Device Deep Learning Steps", (Jan. 1, 2019), XP055736739, Retrieved from the Internet: URL: https://search.proquest.com/docview/23 25379482.

*Primary Examiner* — Aaron W Carter
(74) *Attorney, Agent, or Firm* — Renner, Otto, Boisselle & Sklar, LLP

(57) ABSTRACT

Device(s) and method supporting generation of a second object model, based on a first object model, for object matching according to an object matching algorithm. The first object model comprising object features of an imaged reference object. It is obtained sub-models that comprise different sub-features, respectively, of said object features comprised in the first object model. It is provided contribution indicators for the sub-models, respectively. Each contribution indicator indicating contribution of the sub-feature to incorrect matches. The contribution indicators being based on matching, according to the object matching algorithm, the first object model and the sub-models with at least one model optimization image comprising predefined training features that when matched with the first object model result in at least said incorrect matches.

11 Claims, 9 Drawing Sheets

(51) Int. Cl.
*G06F 18/214* (2023.01)
*G06F 18/22* (2023.01)
*G06V 10/774* (2022.01)
*G06V 20/64* (2022.01)

(52) U.S. Cl.
CPC ............ *G06V 10/74* (2022.01); *G06V 10/774* (2022.01); *G06V 20/64* (2022.01)

(56) References Cited

U.S. PATENT DOCUMENTS

| | | | |
|---|---|---|---|
| 8,370,282 B1* | 2/2013 | Leung | G06V 10/7784 706/20 |
| 2007/0091997 A1* | 4/2007 | Fogg | H04N 19/102 375/E7.176 |
| 2010/0329529 A1* | 12/2010 | Feldman | G06F 18/21375 382/131 |
| 2011/0194731 A1* | 8/2011 | Ben | G06T 7/246 382/103 |
| 2012/0170835 A1 | 7/2012 | Wang et al. | |
| 2013/0039588 A1* | 2/2013 | Li | G06T 1/0028 382/201 |
| 2013/0236107 A1* | 9/2013 | Fukaya | G06T 7/246 382/201 |
| 2020/0314316 A1* | 10/2020 | Hagenburg | H04N 23/72 |
| 2021/0406583 A1* | 12/2021 | Friman | G06V 10/774 |
| 2023/0011759 A1* | 1/2023 | Lu | G16H 30/40 |

FOREIGN PATENT DOCUMENTS

| | | |
|---|---|---|
| JP | 2018195282 A | 12/2018 |
| WO | 2012101717 A1 | 8/2012 |

\* cited by examiner

GENERATION OF A SECOND OBJECT MODEL BASED ON A FIRST OBJECT MODEL FOR USE IN OBJECT MATCHING

This application claims priority of European Application No. 20183322.5 filed Jun. 30, 2020, which is hereby incorporated herein by reference.

TECHNICAL FIELD

Embodiments herein concern generation of an object model for use in object matching according to an object matching algorithm. The object model comprising object features extracted from at least one model teach image imaging a reference object.

BACKGROUND

Visual object matching is about to find one or several instances of a certain object in an image, i.e. a live image, that is, to identify if the object is present in the image or not, and/or find attributes relating to the object in the image, such as its position, orientation and/or scale. To be able to do the object matching, a matching algorithm is to be used for the object matching must be "teached", i.e. informed, about the object to find using one or several images of the object. These images may be referred to as reference images, or model teach images, and the object they are imaging may be referred to as a reference object. The reference object may thus correspond to the object used for 'teaching' or informing the matching algorithm about the object to find.

An object model of the reference object is typically generated from the reference images imaging the reference object, i.e. from the model teach images. The object model is generated by extracting object features of the reference object as imaged by said model teach images. What features to extract may vary depending on application area, and may also depend on which features are possible to extract form the model teach images, what features are characterizing for the object to be found, and/or what kind of features are considered the best to use to later be able to identify the object in live images. Common features to extract are e.g. edges or characteristic landmark points of the imaged reference object, such as a corners, each e.g. corresponding to a corner point with surrounding points.

The object model with extracted object features is then used by the matching algorithm in the object matching, e.g. for matching with live images. It is common that matching algorithms are based on matching different poses of the object model with the live image and then evaluate the result, i.e. how well each pose matches with the live image. For example, each pose may correspond to a certain translation, rotation, scale, or certain combinations thereof, of the object model. It there is a sufficiently good match according to some criteria, it is considered to be a match, i.e. that the object is present in the live image. The pose used for such match may be used to identify how the identified object is located in the image, e.g. its position, orientation and/or scale in the live image.

Ideally all matches should be correct ones, i.e. if a match is sufficiently good the match should always be correct. However, in practice, this is not always the case. When an object model is used with a matching algorithm to find an object, incorrect matches can occur and cause problems. Incorrect matches may e.g. identify an object to be present in an image although it is not, e.g. due to a match on background and/or incorrect objects and/or there may be several matches in an image although only one of them is correct and it may thereby be difficult or impossible to discriminate between them, i.e. to know which match is correct or incorrect. Another problem may be that the incorrect match, although is on the correct object, correspond to an incorrect pose, e.g. incorrect position and/or orientation and/or scale.

An incorrect match can thus be described as a match that results in that the matching algorithm provides a result corresponding to a match although it is not a correct match, i.e. a match that cannot be discriminated from a correct match, at least not under realistic circumstances that can occur in practice when e.g. interference, noise, etc., typically requires all matches within a certain range or above a threshold to be considered a correct match.

It is apparently desirable to reduce occurrence of incorrect matches in object matching and when a matching algorithm is used with an object model.

In the prior art there are solutions that aim to improve the matching algorithms as such, the type of object features to extract from model teach image(s) to include in the object model and to improve the extraction of the features from the model teach image(s), i.e. which features to include in the object model, e.g. by controlling one or more parameters used in the feature extraction that in turn control what is being extracted from the model teach image(s) to be included in the object model. For example by controlling an edge strength threshold that determines which edges to be extracted and included, or how strong, such as magnitude of derivative, an edge must be to be included in the object model.

An example of a prior art solution can be found in US 2012170835 A1.

SUMMARY

In view of the above an object is to provide one or more improvements or alternatives to the prior art, in particular to support provision of an improved object model for object matching, such as one with ability to cause less incorrect matches.

According to a first aspect of embodiments herein, the object is achieved by a method, performed by one or more devices, for supporting generation of a second object model, based on a first object model, for object matching according to an object matching algorithm. The first object model comprising object features of an imaged reference object. Said device(s) obtains sub-models that comprise different sub-features, respectively, of said object features comprised in the first object model. Further, said device(s) provide contribution indicators for the sub-models, respectively. Each contribution indicator of said contribution indicators indicating contribution of the sub-feature of the sub-model to incorrect matches. The contribution indicators being based on matching, according to the object matching algorithm, of the first object model and the sub-models with at least one model optimization image (MOI) comprising predefined training features that when matched with the first object model result in at least said incorrect matches.

According to a second aspect of embodiments herein, the object is achieved by one or more devices for supporting generation of a second object model, based on a first object model, for object matching according to an object matching algorithm. The first object model comprising object features of an imaged reference object. Said device(s) being configured to obtain sub-models that comprise different sub-features, respectively, of said object features comprised in the first object model. Further, said device(s) is configured to provide contribution indicators for the sub-models, respectively. Each contribution indicator of said contribution indicators indicating contribution of the sub-feature of the sub-model to incorrect matches. The contribution indicators being based on matching, according to the object matching algorithm, of the first object model and the sub-models with at least one model optimization image (MOI) comprising predefined training features that when matched with the first object model result in at least said incorrect matches.

According to a third aspect of embodiments herein, the object is achieved by computer program(s) comprising instructions that when executed by said one or more devices causes the one or more devices to perform the method according to the first aspect.

According to a fourth aspect of embodiments herein, the object is achieved by carrier(s) comprising the computer program(s) according to the third aspect.

The second object model may then be generated based on a modification of the first object model with reduced influence of one or more sub-features that, according to the provided contribution indicators, contribute more to the incorrect matches than other sub-features. The reduced influence being in relation to said other sub-features.

In other words, influence is reduced of sub-features that according to the contribution indictors contribute more to incorrect matches compared to sub-features that remain. The second object model will thus comprise object features that contribute less to incorrect matches compared to the first object model. Typically, it is desirable to reduce influence from sub-features that according to the contribution indicators contribute the most to incorrect matches. Reducing the influence of a sub-feature may in some embodiments comprise removing such sub-feature from the first object model or remove parts of it. For example sample such sub-feature more sparse or keep less samples, such as pixels, of such sub-feature when less samples of a feature means less contribution from that feature in the object matching. This enable remaining object features or samples, i.e. in the second object model, to contribute less to incorrect matches and/or comparatively more to correct matches. The second object model may thereby not only enable more accurate results but also be a more efficient model that can be of reduced size and allow for faster implementation. In other words, provision of an improved object model for object matching is supported by embodiments herein.

BRIEF DESCRIPTION OF THE DRAWINGS

Examples of embodiments herein are described in more detail with reference to the appended schematic drawings, which are briefly described in the following.

FIG. 7A is a block diagram illustrating what a match result per MOI for the first object model is based on.

DETAILED DESCRIPTION

Embodiments herein are exemplary embodiments. It should be noted that these embodiments are not necessarily mutually exclusive. Components or parts from one embodiment may be tacitly assumed to be present in another embodiment and it will be obvious to a person skilled in the art how those components or parts may be used in the other exemplary embodiments.

As a development towards embodiments herein, the situation and problem indicated in the Background will first be further elaborated upon and explained with support from some figures.

Figure 1A:
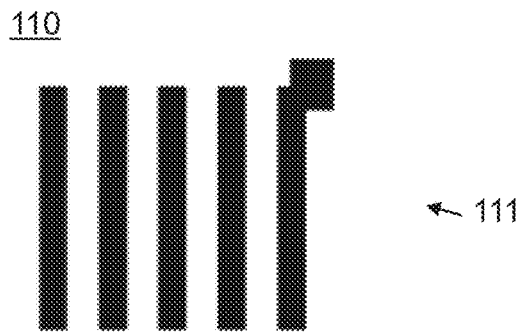
FIG. 1A shows a model teach image imaging a reference object.

FIG. 1A schematically shows a model teach image 110 imaging a reference object 111.

Figure 1B:
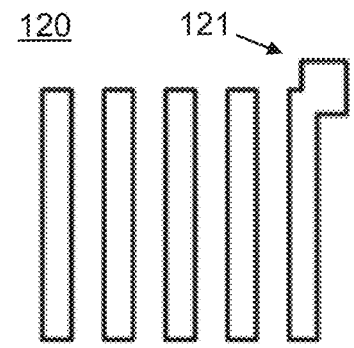
FIG. 1B illustrates a first object model based on features of the reference object.

FIG. 1B schematically illustrates an object model 120 based on features of the 10 reference object 111. The object model 120 may be generated from the model teach image 110. The object model 120 contains object features, here in the form of edges, of the image reference object in the model teach image 110. The object model 120 may be generated by extraction of object features of the reference object 111 as imaged by said model teach image 110. In the figure, a part of the object features that correspond to a more characterizing part 121 of the reference object 111 is pointed out as an example.

Figure 1C:
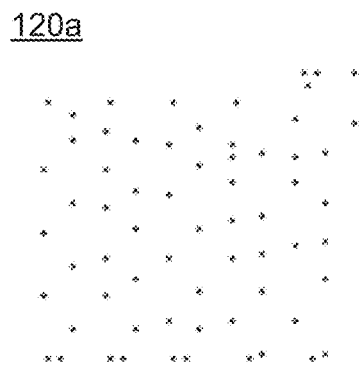
FIG. 1C shows a sparsely sampled version of the first object model.

FIG. 1C shows a sparsely sampled version 120a of the object model 120. Since digital images formed of pixels are typically used, the object features of the object model 120, e.g. edges, are formed of pixels that correspond to dense and uniformly distributed sampled. The sparsely sampled version 120a may thus be provided by removing certain pixels from the edges in the object model 120, or by sampling the edges thereof. In any case, a sparsely sampled version of an object model may be desirable to use for implementation reasons, reducing the data amount and enabling faster object matching using such model.

The object model 120 may be used by a matching algorithm in object matching, e.g. for matching with live images. The matching algorithm may be based on matching different poses of the object model 120 with a live image and then evaluate the resulting match result, e.g. to see how well each pose matches with the live image. For example, each pose may correspond to a certain translation, rotation, scale, or certain combinations thereof, of the object model 120. It there is a sufficiently good match according to some criteria, it is considered to be a match, i.e. that an object corresponding to the reference object 111 is present in the live image. The pose used for such match may can be used to identify how the identified object is located in the image, e.g. its position, orientation and/or scale in the live image.

Forming of score maps are often used in object matching to represent scores of different poses. Some matching algorithms are based on provision of score maps. A score map is a form of match result resulting from matching an object model, e.g. the object model 120, with an image, e.g. a live image, according to a matching algorithm. The score map may be formed by matching the object model at different poses (e.g. translations, rotations and/or scale) with the image, e.g. live image.

A score map comprises scores at different positions of the map. Each position corresponds, or maps, to one or more poses of the object model. Each score can be considered to be a measure, typically in the form of value or number, of how well there is a match and thus how well the object in the live image matches with the one or more poses of the object model that the position corresponds to. The higher the score, the closer to a match is typically the case. The highest score of the score map may thus correspond to the best potential correct match. If the highest score is sufficient for there to be an actual match may depend on if the score is within or above a certain predefined or predetermined range or threshold, that may be configured for the matching algorithm being used, or possible to derive from it and the object model. Score maps are often used for match result when the matching, according to the matching algorithm used, involve trying or testing multiple poses of the object model to match with the image, e.g. live image, and then evaluate which pose(s) resulted in actual match(es), i.e. a result indicating that the object according to the object model at a specific pose is present in the image, e.g. live image. The match result for each pose may correspond to a score at a position of the score map and may e.g. be based on a pixel by pixel comparison or hypothesis testing. Pixel by pixel comparison may e.g. involve to, at each pose of the object model, perform binary multiplication between overlapping pixels of the object model and the image being matched with, and then adding the results to form the score at the score map position corresponding to the pose. Only overlapping pixels that are the same, such as '1', i.e. corresponding to a match on pixel level, will add to the score.

Figure 1D:
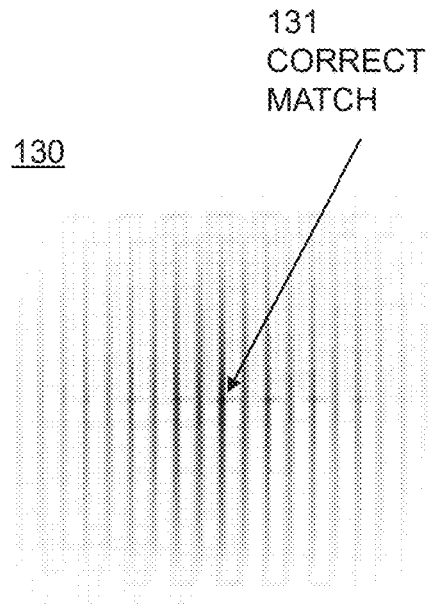
FIG. 1D shows a match result example from object matching based on the first object model resulting in a correct match.

FIG. 1D shows a match result example from object matching based on matching the first object model 120 with the model teach image 110 imaging the reference object 111, just to provide an example that should result in a clear match. Only poses that are translations of the object model have been used in this example. The shown match result is here a score map in the form of a score image 130 to enable graphical representation, i.e. each pixel has a value that corresponds to the score and the higher the score, the darker the pixel in this example. A clear correct match 131 can be identified for a pixel corresponding to a pose of the object model 120 located centrally on the model each image 110, as expected and known to correspond to the correct match.

Ideally all matches according to scores of a score map should be correct ones. However, as already explained in the Background, in practice, this is not always the case. When an object model is used with a matching algorithm to find an object, incorrect matches can occur and cause problems, as explained in the Background.

Figure 2A:
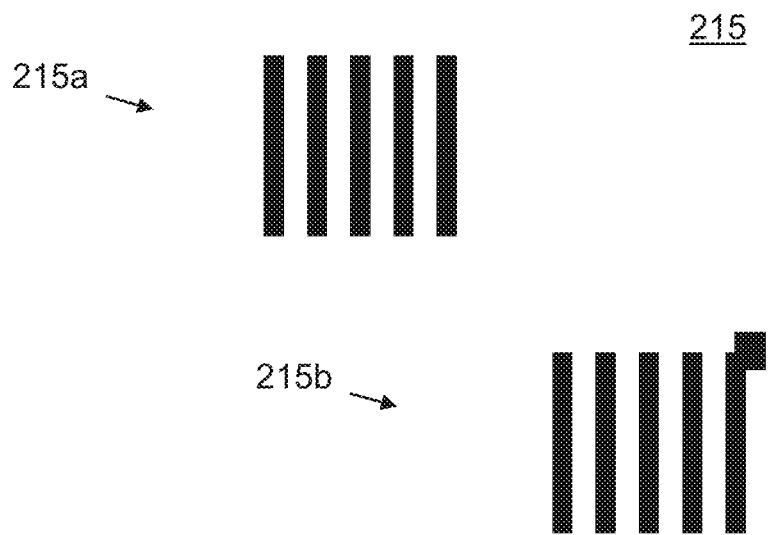
FIG. 2A shows an live image for matching with the first object model.

FIG. 2A shows an example of an image 215, e.g. live image, for matching with 10 the first object model 120, which image 215 is imaging two objects, a first object 215a and a second object 215b. As realized, the object model 120 is desirable to only correctly match with the second object 215b.

Figure 2B:
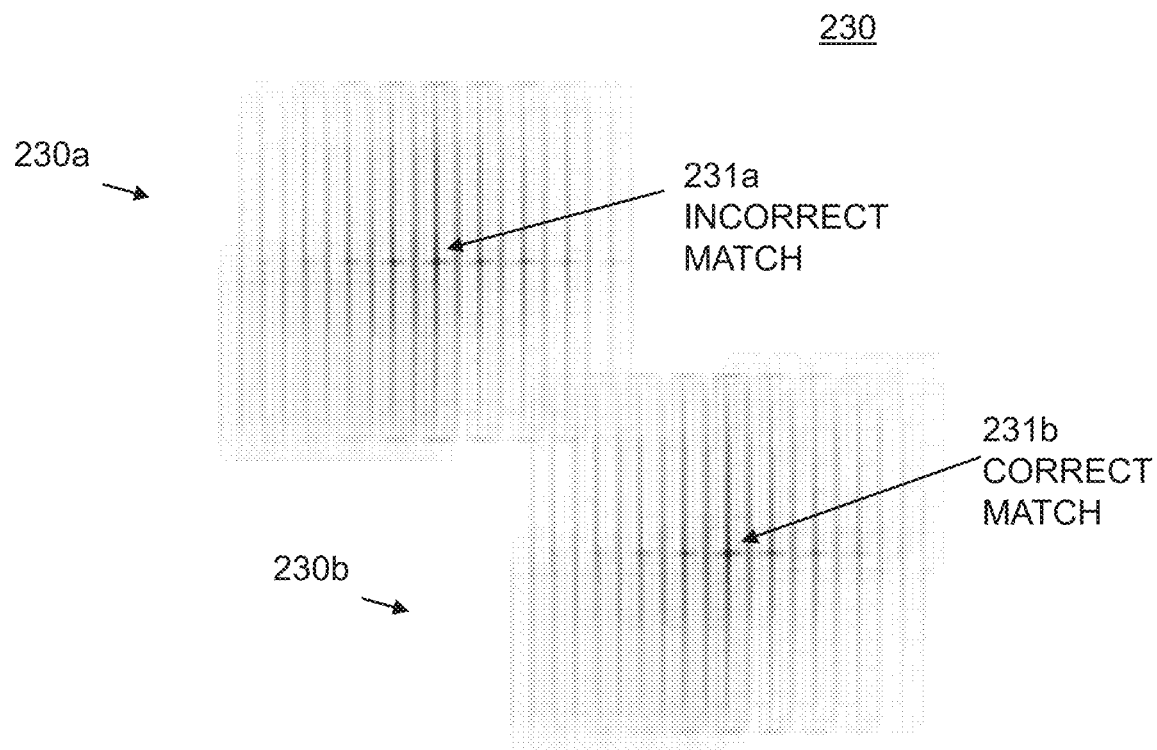
FIG. 2B shows another match result example from object matching based on the first object model and the live image resulting in a correct match and an incorrect match.

FIG. 2B shows another match result example from object matching based on the first object model and the image 215 and a matching algorithm, e.g. the same used above and resulting in the score image 130. The match result is also here a score image, namely a score image 230. As illustrated, two matches are found, an incorrect match 231a and a correct match 231b. The equally dark pixels at the positions corresponding to these matches indicated that the scores are equal or so close that it cannot be discriminated from the scores alone which position correspond to the correct match. In a practical situation, the result could be that the matching algorithm results in that two objects 111 to be located in the image 215, which apparently is not the case.

Hence, in a score map there may be many positions with similarly high scores corresponding to a match although there is only one or even no correct match. This may be due to characteristics of the object model used, the matching algorithm and what the image to be matched with shows and contains, including noise. This often makes it difficult to know which position is the best or correct match. The other positions with high scores, perhaps even the one with highest score, may thus be false, or incorrect, matches. It may be difficult or impossible to distinguish correct matches from incorrect matches. This results in undesirable errors in object matching.

Embodiments herein seek to address this problem by support provision of an improved object model for object matching, one with ability to cause less incorrect matches.

An insight underlying embodiments herein is that certain sub-features of an object model, e.g. 120, such as certain edges, set of edges and/or characteristic landmark points, contribute more to incorrect matches than others and that if such sub-features can be identified and their influence in causing the incorrect matches could be reduced by modifying the first object model, a resulting, new, second object model should be able to cause less incorrect matches and could potentially also be of reduced size.

Embodiments herein will now be exemplified and discussed in some detail with support from figures. First some concepts and relations will be discussed, which further below then will be used in explanation of more complete embodiments.

Figure 3:
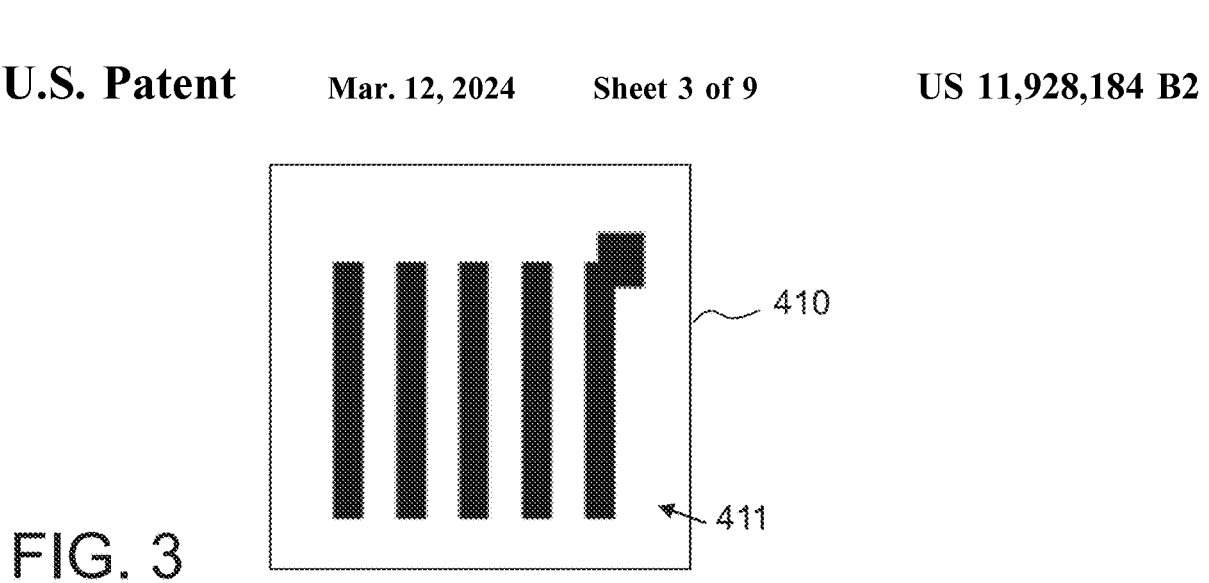
FIG. 3 schematically shows an example of a model teach image imaging a reference object.

FIG. 3 schematically shows an example of a model teach image 410 imaging a reference object 411. The model teach image 410 and the reference object 411 here correspond to the model teach image 110 and the reference object 111, respectively, to facilitate comparison of embodiments herein with the situation discussed above.

Figure 4:
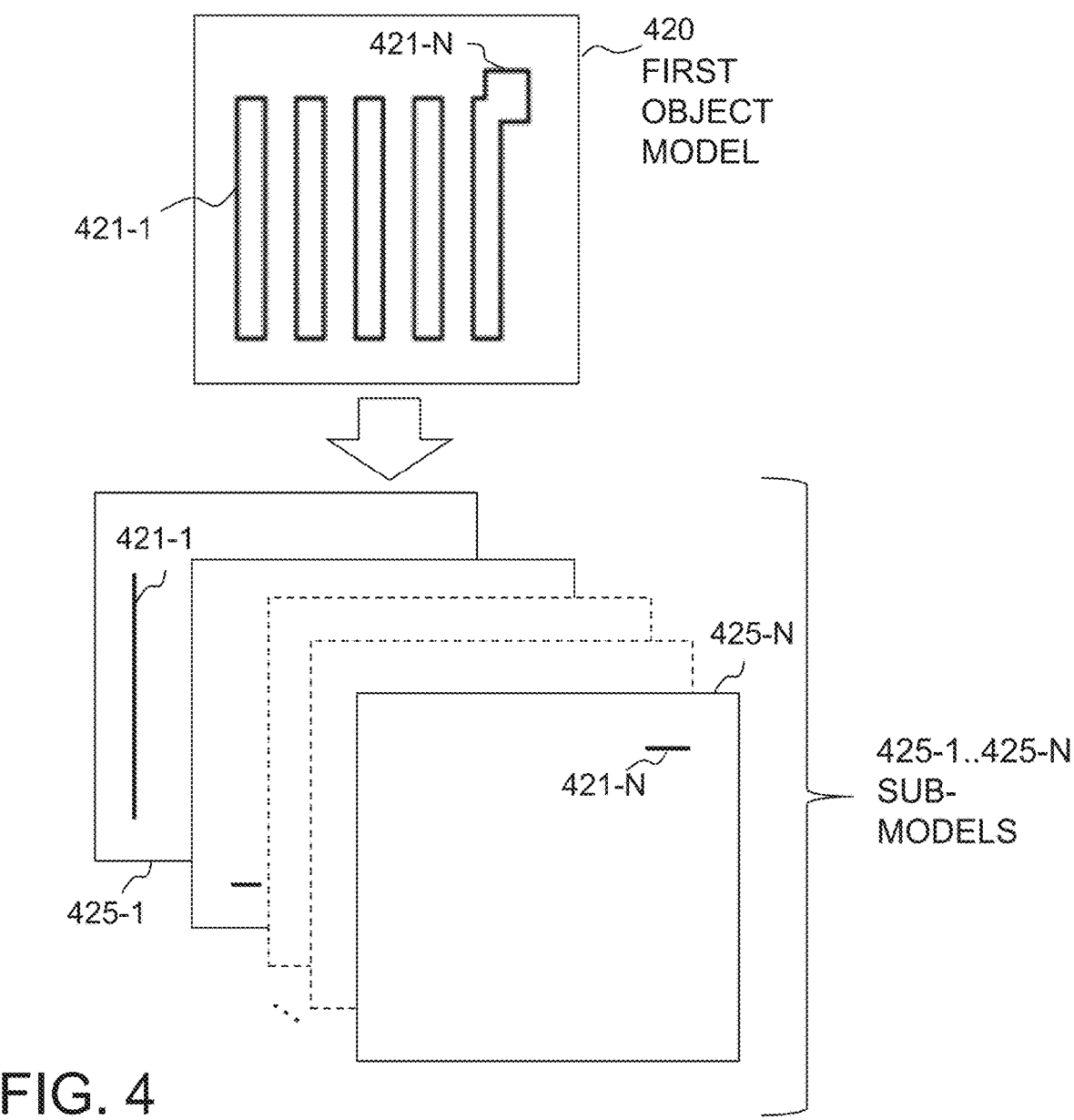
FIG. 4 is a block diagram illustrating forming of sub-models from a first object model.

FIG. 4 is a block diagram schematically illustrating forming of sub-models 425-1 . . . 425-N from, e.g. based on, a first object model 420, where N is an integer number greater than 1 and that may correspond to a number of object features of the first object model 420. The first object model 420 may be based on the model teach image 410, and here corresponds to the object model 120 above, to facilitate comparison of embodiments herein with the situation discussed above. The first object model 420 may correspond to a conventional object model. Each sub-model, e.g. a sub-model 425-n of the first object model 420 comprise sub-features, i.e. one or more but not all features of the first object model 420. For example, each edge or a group of edges of the first object model may form a sub-model. The sub-features of the total of the sub-models 425-1 . . . 425-N should correspond to the total of object features of the first object model 420, there may thus be sub-features 421-1 . . . 421-N, in the example in the form of edges. In the figure, a sub-feature 421-1 in the form of an edge and another sub-feature 421-N in the form of another edge have been indicted to facilitate understanding and for later comparison. Note that a (single) sub-feature can comprise several edges part of object features, although not shown in these examples, and/or e.g. characteristic landmark points part of object features.

Further note that although the models shown in the examples herein have edges as object features, any kind of features of an imaged object can additionally or alternatively be used, e.g. landmark points or areas as mentioned above, e.g. pixels in a local area covering a characterizing feature, such as a corner, of the reference object. What constitutes an object feature can thus vary between embodiments and not only in the type(s) of feature(s) involved but also what is included in each object feature. For example, if the type of feature is edge, an object feature may be a single edge or several edges. Hence, in this example, a single sub-feature of the total of object features may correspond to a single edge of the total of object edges, or several edges and/or parts of one or more edges of the total of object edges, as already indicated above.

Figure 5:
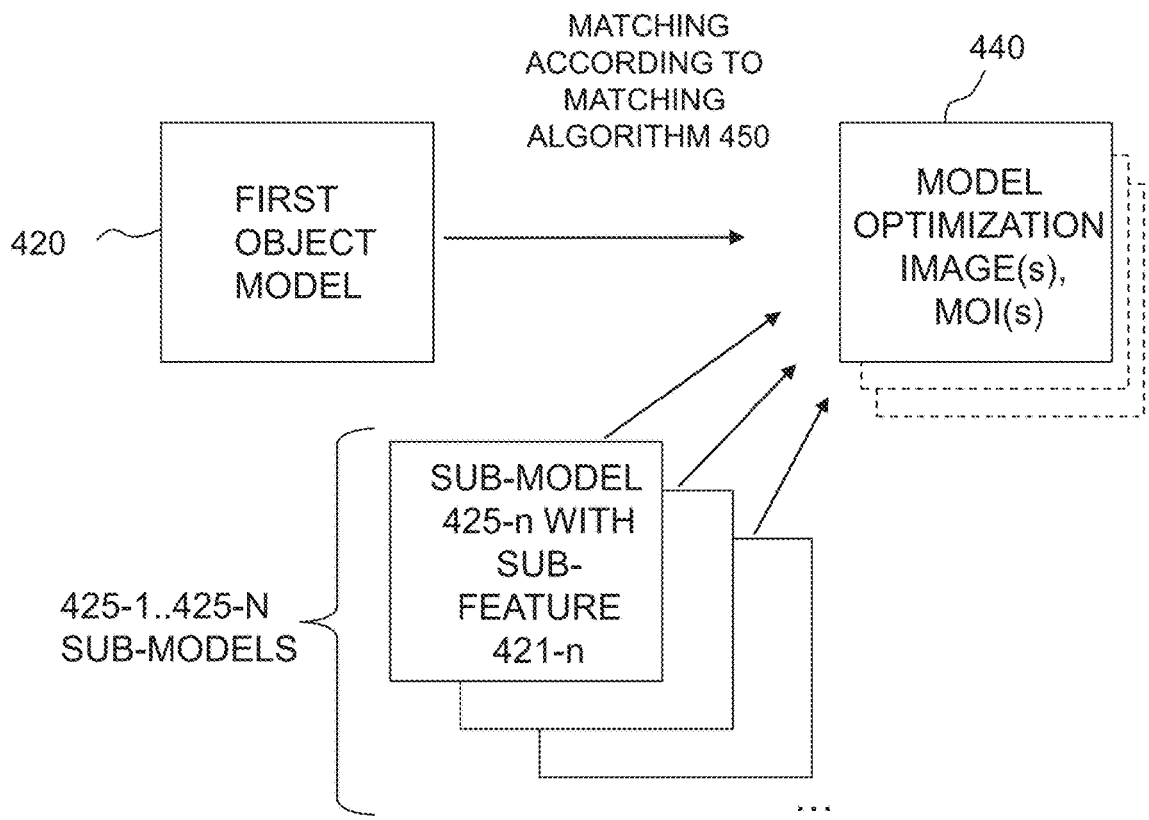
FIG. 5 is a block diagram illustrating matching of the first object model and the sub-models thereof with model optimization image(s).

FIG. 5 is a block diagram schematically illustrating matching of the first object model 420 and the sub-models 425-1 . . . 425-N thereof with at least one model optimization image (MOI) 440. The matching is thus according to a matching algorithm 450 for use with and e.g. that conventionally is used with the first object model 420. For example, the matching algorithm may be based on a pixel by pixel comparison or hypothesis testing as mentioned in connection with FIG. 1. The same matching algorithm is used for all object matchings shown in the figure. Each model is matched with the MOI(s) 440. If there are several MOIs 440, there is thus as many object matchings per model as MOIs.

Figure 6:
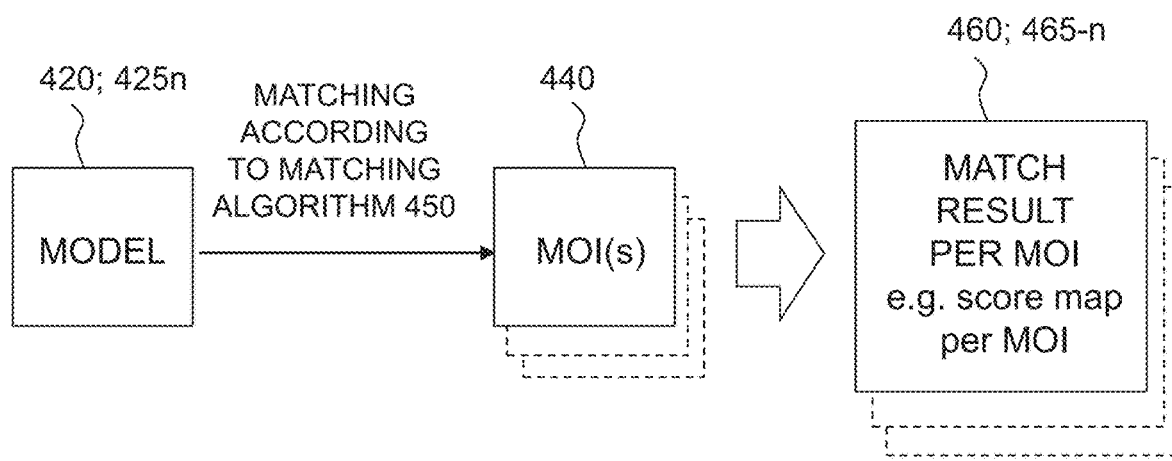
FIG. 6 is a block diagram illustrating how each matching of a model with the model optimization image(s), MOI(s), results in a match result per MOI.

The general relation for a single model is also schematically illustrated in FIG. 6.

FIG. 6 is a block diagram schematically illustrating how each matching of a model, e.g. a sub-model 425-n being any one of the sub-models 425-1 . . . 425-N or the first object model 420, are matched with the MOI(s) 440 according to the matching algorithm 450 and the result is at least one match result 460; 465-n, i.e. match result(s) since there is a match result per MOI, e.g. a score map per MOI. The match result 460 is for the first object model 420 and the match result 465-n is for any one of the sub-models 425-1 . . . 425-N.

The MOI(s) may be one or more images, each with patterns, e.g. resulting from imaging of suitable objects and/or backgrounds for matching with the object model and that are able to cause at least one or more incorrect matches. The MOI(s) may e.g. comprise image(s) imaging an object or objects that are similar to the reference object and/or other objects, background patterns etc. that are likely and/or known to cause incorrect matches when used with the matching algorithm. One or more of the imaged object(s) in the MOI(s) 440 may correspond to the reference object 411 at one or more poses, e.g. translations, rotations and/or scaling, but not necessarily. In such case can be expected or may be known that there should at least one correct match in the object matching with the first object model 420 in addition to the one or more incorrect matches. The MOI(s) may be, be based on or comprise one or more, even all, of the model each images(s), but not necessarily.

The skilled person may select or form suitable MOI(s) in a real case based on knowledge of the reference object and/or first object model to be matched with, the matching algorithm being used and/or operative conditions, e.g. information on situations that can occur and cause risk for incorrect matches during operation, i.e. when object matching is performed on live images.

In some embodiments the MOI(s) comprise distorted version of the model teach image(s), to thereby enable training when e.g. the stability of features cause matching problems. This enable a second object model that is better to avoid such matching problems. In some embodiments the MOIs(s) image other object than the reference object and/or background to enable training on spurious matches on the other objects and/or background and thus enable a second object model that is better to avoid that kind of matching problems.

Figure 7A:
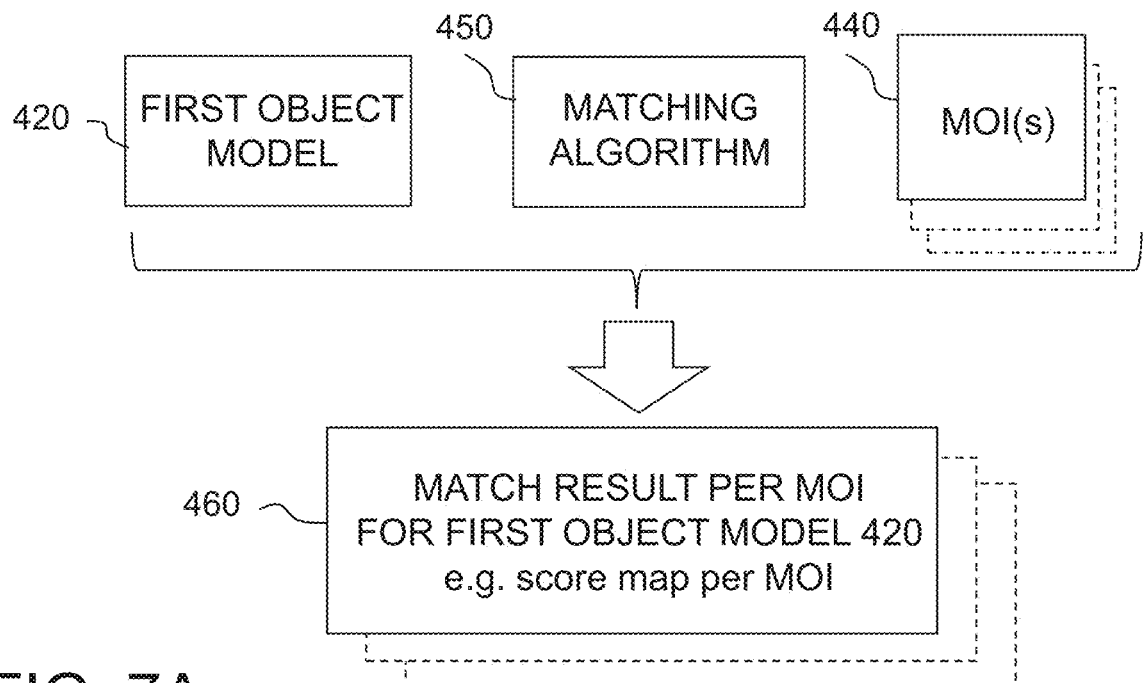

FIG. 7A is a block diagram schematically illustrating that the match result 460, e.g. score map, per MOI 440 for the first object model 420 is based on the first object model 420, the matching algorithm 450, and the MOI(s) 440. The match result 460 per MOI can be used to identify which poses of the first object model 420 result in incorrect matches, and correct matches if such are present in the MOI(s). If the match result is a score map, the poses may be found by identifying positions in the score map per MOI that have scores predefined or predetermined to correspond to a match. See further explanation of score maps below. A match result, e.g. score, that corresponds to the best possible match can be found from knowledge of the complete object model, e.g. the first object model 420 and the matching algorithm being used, since it is about matching the first object model with itself. Some predefined margin in relation to such theoretically best may define what is to be considered a match in practice where a theoretical perfect match often cannot be expected, and should not be needed for there to be a match in a practical situation.

Figure 7B:
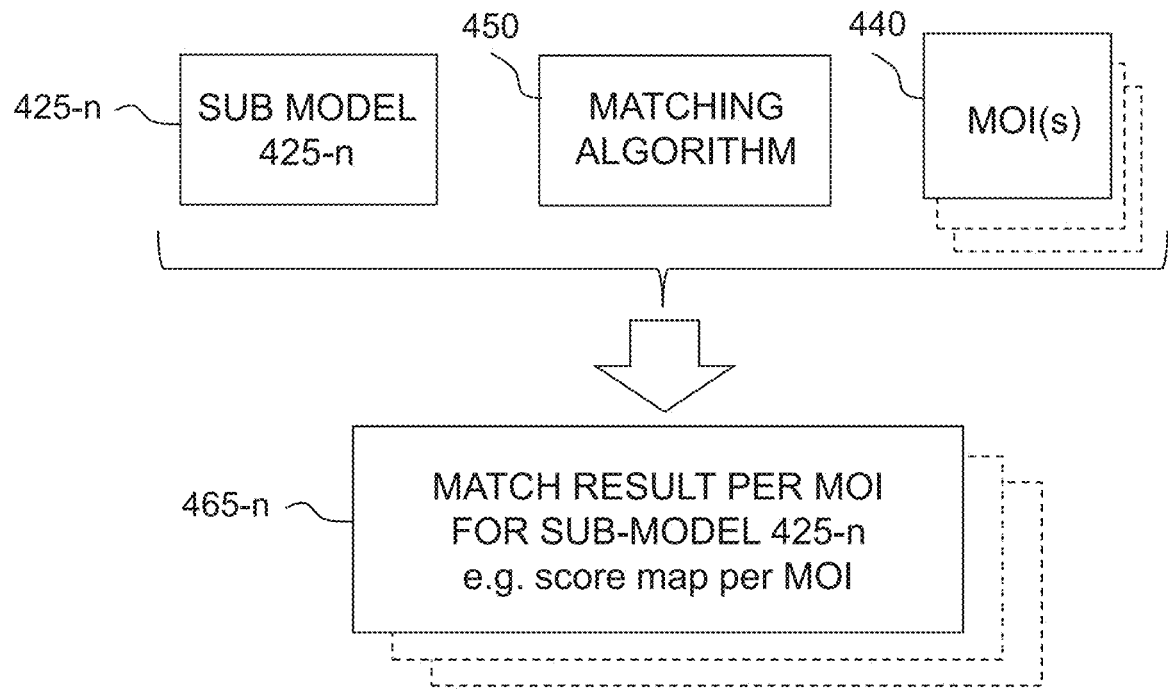
FIG. 7B is a block diagram illustrating what a match result per MOI for a sub-model is based on and that the match result is used to provide a contribution indicator for the sub-model.

FIG. 7B is a block diagram illustrating that the match result 465-n, e.g. score map, per MOI 440 for each sub-model 425-1 . . . 425-N, is based on the sub-model 425-n, the matching algorithm 450, and the MOI(s) 440. The matching algorithm and the MOI(s) are the same as in FIG. 7A. The same poses as used as for the first object model 420 in the example of FIG. 7A are thus used for each sub-model 465-n. If the match results are in the form of score maps, the corresponding positions in each sub-model score map and the first object score map should map to the same poses(s). Since the poses that cause the incorrect matches, and correct match(es) if any, are known from the matching of the first object model, the match result can be found for the sub-models for these poses as well. When the match results are in the form of score maps, explained further below, the score of the sub-models can be found at the position of the match.

Such match results, e.g. scores, relating to sub-models may correspond to, or be used to identify, contribution of the sub-model, and thus the associated sub-feature, to the match according to matching with the first object model, such as in the example of FIG. 7A, i.e. with the first object model 420.

The match results per MOI for a sub-model may then be used to provide, typically by computing, a contribution indicator. Contribution indicator is further explained below, however, first the concept of score maps will be further explained in the context of embodiments herein.

Figure 8:
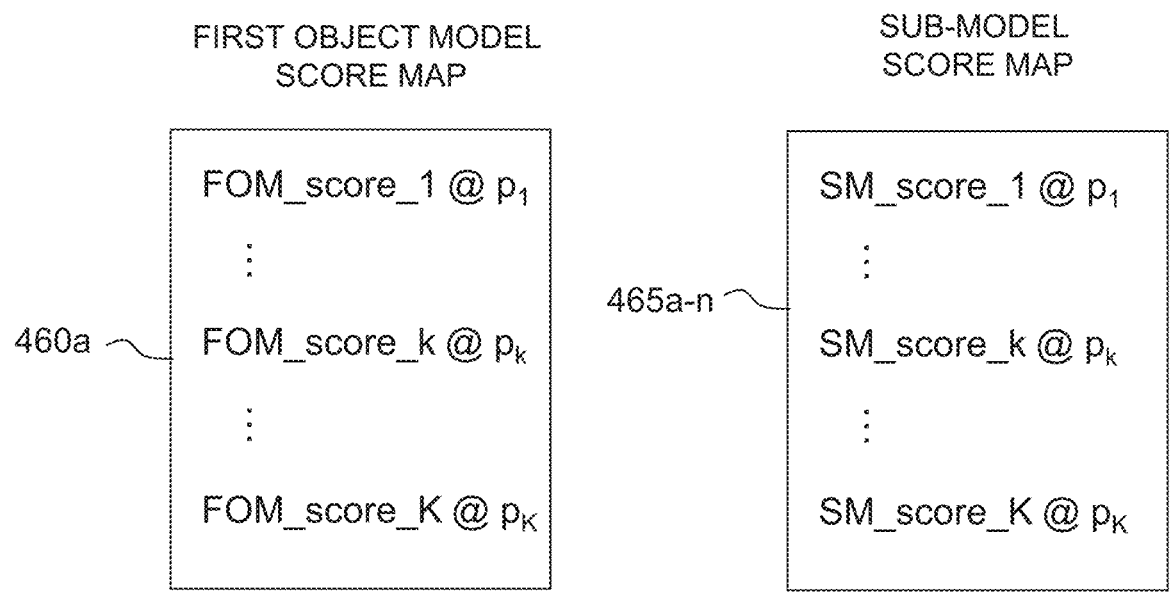
FIG. 8 is a block diagram illustrating a first object model score map and a sub-model score map.

FIG. 8 is a block diagram schematically illustrating a first object model score map 460*a* and a sub-model score map 465*a-n*, just to better explain the general principle behind score maps as match results as already mentioned above. The score maps are thus example of match results, e.g. of the match result 460 and 465-*n* as in FIGS. 7A-B.

Each score map is resulting from matching between an object model or any one of the sub-models 425-1 . . . 425-N, and a MOI at different poses, e.g. translations, rotations and/or scaling, of the model in question. Each position stores the result from matching of a specific pose or poses with the MOI in the form of a score.

There is thus one score map per model and MOI, in other words, for one MOI there is e.g. one score map 460*a* for the first object model 420 and a score map 465*a-n* for the sub-model 425-*n*. There are K scores and positions in each score map, corresponding to the number of poses used in the matching, or set of poses if each position holds results from matching of several poses. There are thus K positions p1 . . . pK, where any position thereof may be referred to as position pk, where k may range from 1 to K, and K being an integer >1. At each position of the score map there is stored a score being said result from matching of a specific pose or poses with the MOI. For example, in the figure, there are scores FOM_score1 . . . FOM_score_K in the first object model score map 460*a* at positions p1 . . . pK, respectively, and scores SM_score_1 . . . SM_score_K in the shown sub-model score map 465*a-n* at positions p1 . . . pK, respectively. From a position of a score map it can be found which pose or poses of the model were used in the matching that resulted in the score, i.e. each position is associated with one or more poses. Exactly which pose or poses each position relates to is predefined or predetermined and it is implied that the relation is maintained, i.e. so that it later can be identified from a position of the score map, which pose or poses that was used in the matching resulted in the score of that position.

Each score of a score map may be described as a matching level indictor, typically in the form of a value, e.g. an integer number, indicating how well the pose in question matches with the MOI. A score in the form of an integer number may e.g. indicate a level or a degree of matching, such as how many pixels are matching, between the MOI and the model at the pose associated with the position.

Since, as mentioned above, the same MOI and model poses are used for the sub-models and the full, first object model, there are the same number of positions pk in the score maps and the corresponding positions, e.g. positions p1, in all score maps 460*a* and 465-1 . . . 465-N, correspond to the same pose or poses. This makes it possible to relate scores, and thus matches, between the models and thereby also find out how much a sub-feature of a certain sub-model contributes to the full, first model score at a certain poses or poses, and in particular to such pose or poses that result in matches, such as incorrect matches. Since each model, as explained above, is formed of a sub-feature from the object features of the full, first object model, the contribution of a sub-model 425-*n* is in fact contribution of a sub-feature 421-*n* of the first object model 420.

In other words, each score is thus measure of how well there is a match between the associated pose of the model and the MOI, and thus how well the model at the corresponding pose matches with the MOI. This is similar how a score map is produced conventionally, but with the MOI instead of e.g. a live image. A difference lies in the use of the sub-models and that these are matched with the same MOI(s) as the original object model, e.g. the first object model 420, that the sub-models are based on. Another difference is also that the MOIs may be controlled and e.g. predefined or predetermined, which of course is not the case in conventional object matching and live images. Each score of sub-model score map is a measure of how well there is a match and thus how well the sub-model, e.g. a certain edge of the first object model, at the corresponding pose matches with the MOI.

As should be realized, for each MOI, in case of multiple MOIs, there should be produced a first model score map and sub-model score maps, one per sub-model. That is, there will, per MOI, be a set with as many score maps as sub-models plus one for the first object model. In case there are multiple MOIs, there will thus be multiple sets of score maps, one set per MOI.

To able to compare sub-models and their respective contribution to matches of the original object model, e.g. the first object model 420, and thereby the contribution of sub-features to the object features of the first object model, it would be desirable with a measure, or indicator, that indicates the contribution to incorrect matches, preferably in relation to, or compared to, contribution to correct matches, and that allows for simple comparison between sub-models to see which ones are contributing more/less compared to the others. There may thus be provided, as already mentioned above, contribution indicators for the match results per MOI for a sub-model. For example, the sub-model 425-*n* shown in the figure, may then be used to provide, typically by computing, a contribution indicator 425-*n*. Contribution indicator is further explained below, however, first the concept of score maps will be further explained in the context of embodiments herein.

Based on the original model, e.g. the first object model 420, the sub-models thereof, the matching algorithm being used, the MOI(s) and match results, e.g. score maps, it can be computed such a measure or indicator, typically in the form of a value or number, for each sub-model, e.g. indicating how much this sub-model is prone to generate or result in incorrect matches, in relation to correct matches if any, and for comparison between the sub-models. It can thereby be found sub-models with sub-features that likely contribute the least and the influence of these sub-features can be reduced, e.g. be removed from, the original, first object model, forming a new second object model able to result in fewer incorrect matches or at least reduce the risk of incorrect matches that cause matching errors. Also, as may be realized, sub-model match results, e.g. a score map of a sub-model, although they contain information on the sub-feature contribution to matches in the original object model score map, e.g. of the first object model 420, may be difficult to compare as such, with several scores, e.g. values, to manage etc. This is also a reason that embodiments herein instead apply contribution indicators as mentioned above associated with the sub-models, respectively, and for comparison between them.

Each contribution indicator, e.g. in the form of a contribution measure, regarding a sub-model, and thereby the sub-feature thereof, should thus indicate how much the sub-feature of the sub-model contributes to incorrect matches for the original, first object model. This enable to compare contribution indicators between sub-models and find out those that relative the other sub-models are contributing more to incorrect matches.

Hence, with reference to score maps, it should not be favorable for a sub-model if its score map, i.e. sub model score map, has a high score at a position where the first object score map has an incorrect match, but favorable if it has similarly high score at a position where the first object score map has a correct match. It would be desirable with contribution indicators reflecting this. See example below for an example of such a contribution indicator. If a MOI is imaging the reference object of the first object, e.g. so there should be at least one correct match, with noise added, robust sub-models should be favored. In other words, sub-models, and thereby corresponding sub-features of the first object model, that despite the noise contribute more to the correct match than other sub-models, and less to incorrect matches (if any in that MOI), should be more favored than those that are not.

Figure 9:
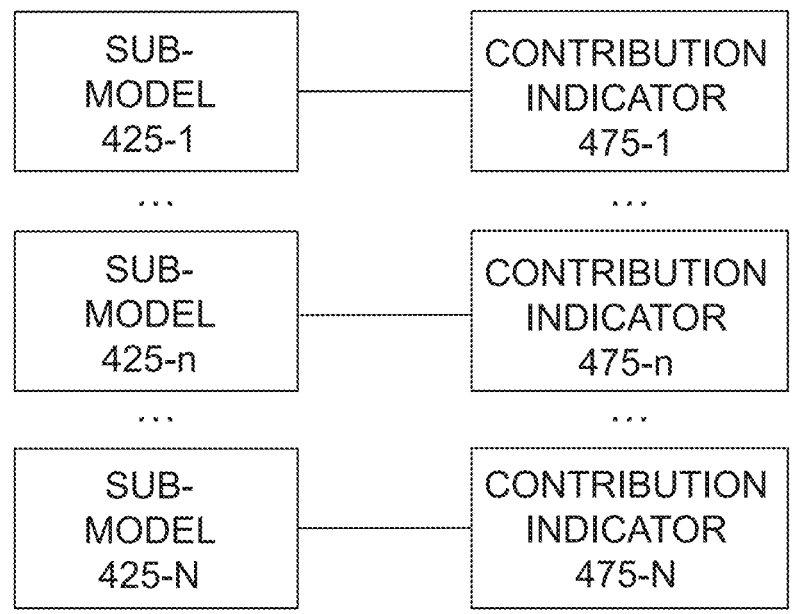
FIG. 9 is a block diagram illustrating that there for each sub-model is provided a contribution indicator.

FIG. 9 is a block diagram illustrating that there, as already indicated above, are provided, typically computed, contribution indicators 425-1 . . . 425-N for the sub-models 425-1 . . . 425-N, respectively. For each sub-model 425-n it is thus provide a contribution indicator 475-n. A contribution indicator of a sub-model may be described as measure, relative to some reference that is the same for all sub-models, of how much the sub-feature of that sub-model contributes to incorrect matches.

In case of multiple MOIs and thus a match result, e.g. score map per MOI, for each sub-model, a single contribution indicator for the sub-model may be computed from a sum of sub-contribution indicators, each sub-contribution indicator computed per match result, e.g. per score map, and thus per MOI. For example, in case of several MOIs there may be provided a sub-contribution indicator per MOI, e.g. a sub-contribution score per MOI, for each sub-model, and then these partial sub-contribution scores may be added to form a total contribution score per sub-model that thereafter may be used for comparison between sub-models. An advantage with this approach and using multiple MOIs may be that it can result in a better selection of sub-models and thereby sub-features that are "best" to suppress or remove, enabling improved selection and thereby an improved second object model.

For the computation of a contribution indicator it is desirable to know which match results, e.g. scores in a score map, correspond to matches, and if a match is correct or incorrect.

In case a certain pose of a sub-model is known to correspond to the correct match, e.g. since a MOI is known to contain this pose of the reference object, then the position of this pose in the score map corresponds to the correct match. Incorrect matches can be found as being all other positions, e.g. with scores in a score map dose to the correct match, e.g. above a certain predefined or predetermined threshold or within a predefined or predetermined range covering the correct match, as already indicted above.

Note that if there is known to be a correct match in a MOI but not exactly which pose that corresponds to the correct match, it may in some embodiments be assumed that the highest score of the original model, e.g. the first object model score map 460a, is the correct match and all other matches are incorrect matches. This may be a reasonable assumption since the MOI is predefined or even predetermined and the correct match can be controlled and may be based on the reference object, thereby causing a "perfect" match. Also, the methods according to embodiments herein can be performed at controlled conditions since it is about "training" to enable an improved or even optimized second object model, and during the training influence of undesired interference, e.g. noise, typically can be controlled and e.g. reduced, or even minimized. In case there is a symmetrical reference object, then there may be one or more further correct matches that cannot be distinguished by highest score. However, in such case, or in general when it is known how many correct matches the reference object in a MOI should result in, the corresponding number of highest scores may be assumed to correspond to the correct matches.

Note that embodiments herein, as already indicated, work also without there being any correct match in any MOI. In that case it can be considered to be about finding and suppressing matches, that thus are incorrect matches.

When the match result is in the form of a score map, the contribution indicator may be referred to as a contribution score, which will be used in the following.

It would be desirable with an algorithm for computing contribution scores that would reward correct matches but the opposite for incorrect matches, e.g. increase the contribution score of a sub-model when/if it contributes to a correct match and decrease it to a corresponding degree for an incorrect match. For example, if there is equal contribution in a first sub-model to a correct match as that of an incorrect match, then these contributions may be considered to balance out each other. If there is twice contribution to incorrect matches for a second sub-model, then the second sub-model should be less favorable to keep.

One way of accomplishing this may be to, per sub-model and MOI, create a first sum of all match results, e.g. scores, for incorrect matches, then a second sum for correct matches, and then relate the sums to each other, e.g. divide the second sum with the first sum. It may thus be desirable to only use matches (correct and incorrect ones), e.g. use scores for positions that in the original object model score map, e.g. the first object model score map 460a, indicate match, which are the positions with the highest scores, e.g. all scores above a score threshold as already mentioned above. The score threshold may be set based on what a correct match would or may result in.

Another option than summing the incorrect match scores and the correct match scores separately in the first and second sums, may be to separately sum the number of correct matches and the number of incorrect matches, and then divide the number of correct matches with the number of incorrect matches.

However, it could simplify computations and facilitate implementation if all scores, i.e. for all positions, were used to compute the contribution score, without having to select out scores for positions that correspond to incorrect and correct matches, i.e. without having to find out and apply a score threshold as above.

This can be accomplished by involving the scores of the original model match result, e.g. the first object model score map 460a, and use these for weighting that enhances the influence of sub-model scores corresponding to correct and incorrect matches and suppresses influence of the other sub-model scores. For example, by multiplying each sub-model score in said sums with a function F of the first model score map and which function, e.g. depending on its score at each position, enhances or suppresses the sub-model score at the same position. An example of such function F and how it can be used is given below. In fact, the above situation with only using correct and incorrect matches in the sums can be realized with such function F that depending on the first model score at the positions either multiply the corresponding sub-model score with 0 or 1 depending on if the first model score is below or above said score threshold. This however still requires the score threshold to be provided, e.g. computed. Another option is therefore to utilize that the first model score map at correct and incorrect matches, by definition, has its highest scores and at all other positions has lower scores. Hence, a weighting can be accomplished by at each position simply by multiplying the sub-model score with the first model score at the same position. However, if the function exponentially increases with the first model score, the effect will be improved, i.e. the function F is score>m, with m>1. It has shown that e.g. the square of the first model score, i.e., m=2, may be sufficient and suitable weight function F, although even higher n:s may work even better.

The following is an example of an equation, Eq. 1, of how a contribution indicator in the form of a contribution score, CS, may be computed for a sub-model per MOI, i.e. how it may be computed according to some embodiments herein:

$$CS = \frac{\Sigma_k (P\_corr(p_k) * SM\_score(p_k) * F(FOM_{score(p_k)}))}{\Sigma_k ((1 - P_{corr(p_k)}) * SM\_score(p_k) * F(FOM_{score(p_k)}))} \quad \text{Eq. 1}$$

where SM_score(pk) and FOM_score(pk) are scores according to the sub-model score map and the full, or first, object score map, respectively, for the position pk, and each sum is over "all k", i.e. k=1 . . . K, or in other words for all positions p in the respective score map. F is a function as discussed above, and further explained below, based on the FOM_score, i.e. on the first object score map. Pcorr is a function that evaluates to 1 when the position pk corresponds to a correct match and else to 0.

As realized, the example contribution score CS of Eq. 1 increases with correct matches and decrease with incorrect matches, and thus, the lower CS of this kind a sub-model has in comparison with the sub-model with the highest CS, the "worse" it is. Of course the CS could be inversed and then the higher CS, the "worse". Note the special case with Eg. 1 when there is no correct match in the MOI, all CS would be 0, and hence in that case, the numerator should be set to 1, i.e. in the case when P=0 for all k.

Since, as explained above, positions with scores that are matches (incorrect and correct ones) are either predefined, predetermined or can be determined, and the MOI(s) can be controlled, e.g. be predefined or predetermined, P can easily be determined as well.

If it is known to be only incorrect matches in a MOI, and no correct ones, i.e. in Eq. 1 that P=0 for all pk, the numerator of Eq. 1 should as mentioned in this case be replaced with 1. In this case it thus suffice to compute a contribution score CS for each sub-model according to:

$$CS = \Sigma_k (SM\_score(p_k) * F(FOM_{score(p_k)})) \quad \text{Eq. 2}$$

Hence, by using MOI(s) that contain incorrect matches but no correct matches, computations can be simpler and thereby implementation facilitated and/or execution be faster. However, it may for other reasons be desirable with an algorithm for computing contribution scores that work both in the case of there being correct match(es) in the MOI(s) and without there being any correct match, such as in the case of Eq. 1. In any case, the MOI(s) used should at least contain incorrect matches to enable "training" on such using the full, first object model and the sub-models so that the second model at least can be better to suppress incorrect matches, although it is typically desirable with also correct matches involved.

As mentioned, an advantage with Eq. 1 and Eq. 2 is that the contributions scores are computed for all positions p in the score maps, also positions that are not corresponding to matches. The weighting by F supports this. As already explained above, in some embodiments F is the square of the score, that is:

$$F(FOM_{score(p_k)}) = (FOM_{score(p_k)})^2 \quad \text{Eq. 3}$$

Figure 10A:
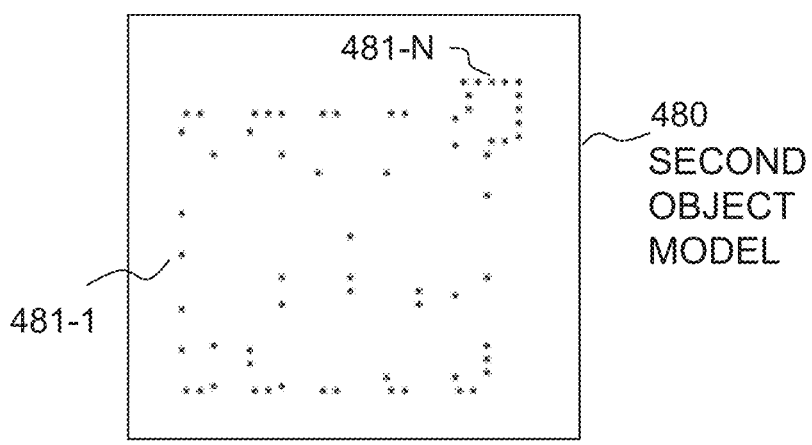
FIG. 10A illustrates a second object model based on the first object model and embodiments herein.

FIG. 10A illustrates a second object model 480 based on the first object model 420, in accordance with what has been discussed above and embodiments herein. More particularly, the second object model 480 is based on application of Eq. 1 and Eq. 3.

As recognized, the shown second object model 480 is a sparsely sampled version of object model and may be compared to the sparsely sampled object model 120a in FIG. 1C that is a conventionally sparsely sampled version of the object model 120 that, in turn, corresponds to the first object model 420. The conventional sparsely sampled object model 120a comprise samples that are evenly spread out, substantially uniformly.

The resulting contribution scores from application of Eq. 1 and Eq. 3 have been used prioritize the sub-features in relation to each other according to their contribution scores. Sub-features with lower contribution scores have been more sparsely sampled than those with higher contributions scores that have been, resulting in the second object model 480. The second object model 480 is thus based on a modification of the first object model 420 with reduced influence of sub-features, e.g. of the sub-feature 421-1, that, according to the provided contribution indicators, e.g. 475-1 . . . 475-N, contribute more to the incorrect matches than other sub-features, e.g. than 421-N. As can be seen in FIG. 10A, the part that corresponds to the characterizing feature 121 is more densely sampled since it, and in accordance with contributions scores relating to it, is not contributing to incorrect matches as much as other features. For example, a sub-feature 481-1 of the second object model 480 that corresponds to the sub-feature 421-1 of the first object model 420 is less densely sampled than a sub-feature 481-N of the second object model 480 that corresponds to the sub-feature 421-N of the first object model 420. The more dense sampling means, with the matching algorithm used in this case, that the influence of such feature in the second object model 480 will be greater compared to influence from less dense sampled parts.

Figure 10B:
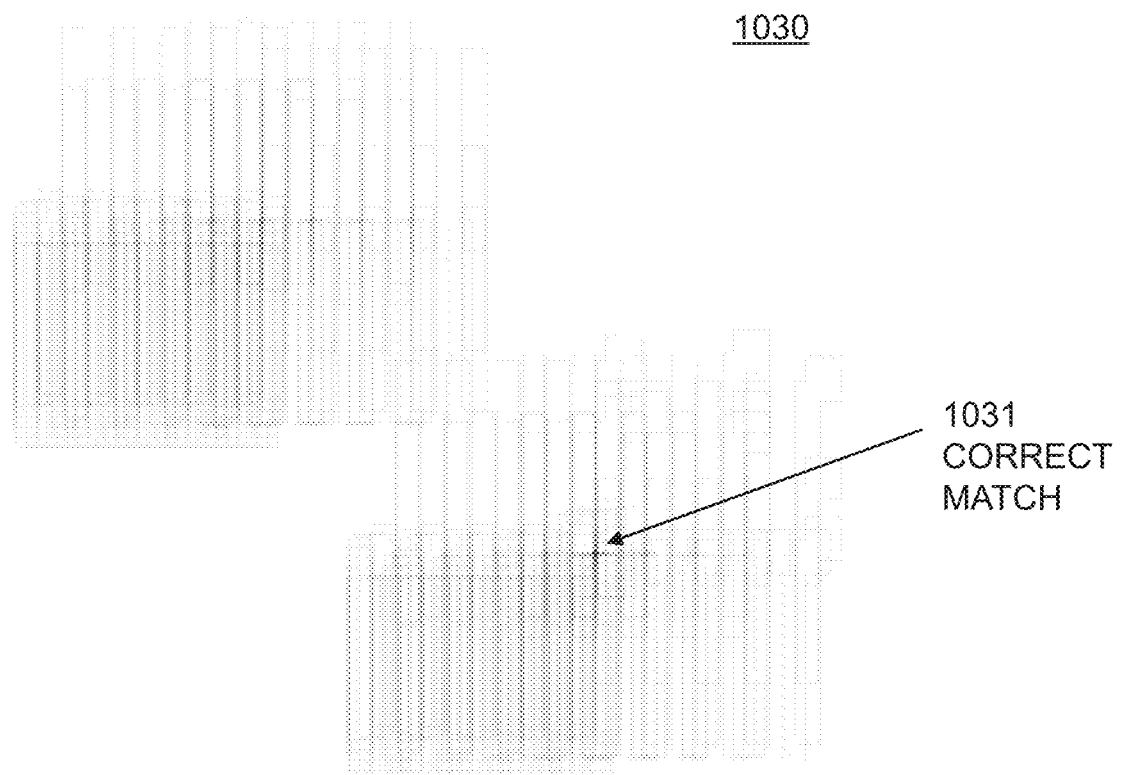
FIG. 10B illustrates a match result example from object matching based on the second object model and the live image for comparison with FIG. 2B.

FIG. 10B illustrates a match result example in the form of a score map that is a score image 1030 resulting from object matching based on a second object model generated according to embodiments herein and the image 215 in FIG. 2A, for comparison with the result in FIG. 2B. As can be seen in FIG. 10B, application of embodiments herein, and the increased influence that thereby was given the part corresponding to the characterizing feature 121 relative to other object features, has resulted in that the position of the incorrect match 231a in FIG. 2B now, in FIG. 10B, has a lower score, not making it a match. It is therefore only a single match, namely a correct match 1031 at the position of the correct match 231*b* in FIG. 2B, and no incorrect match. In other words, from the score image 1030 it is, thanks to embodiments herein, possible to identify and find information about the correct object, i.e. object 215*b,* in the image 215, without risking to instead or also match with the object 215*a.* The second object used here and generated according to embodiments herein is thus improved compared to the first object model 420.

Figure 11:
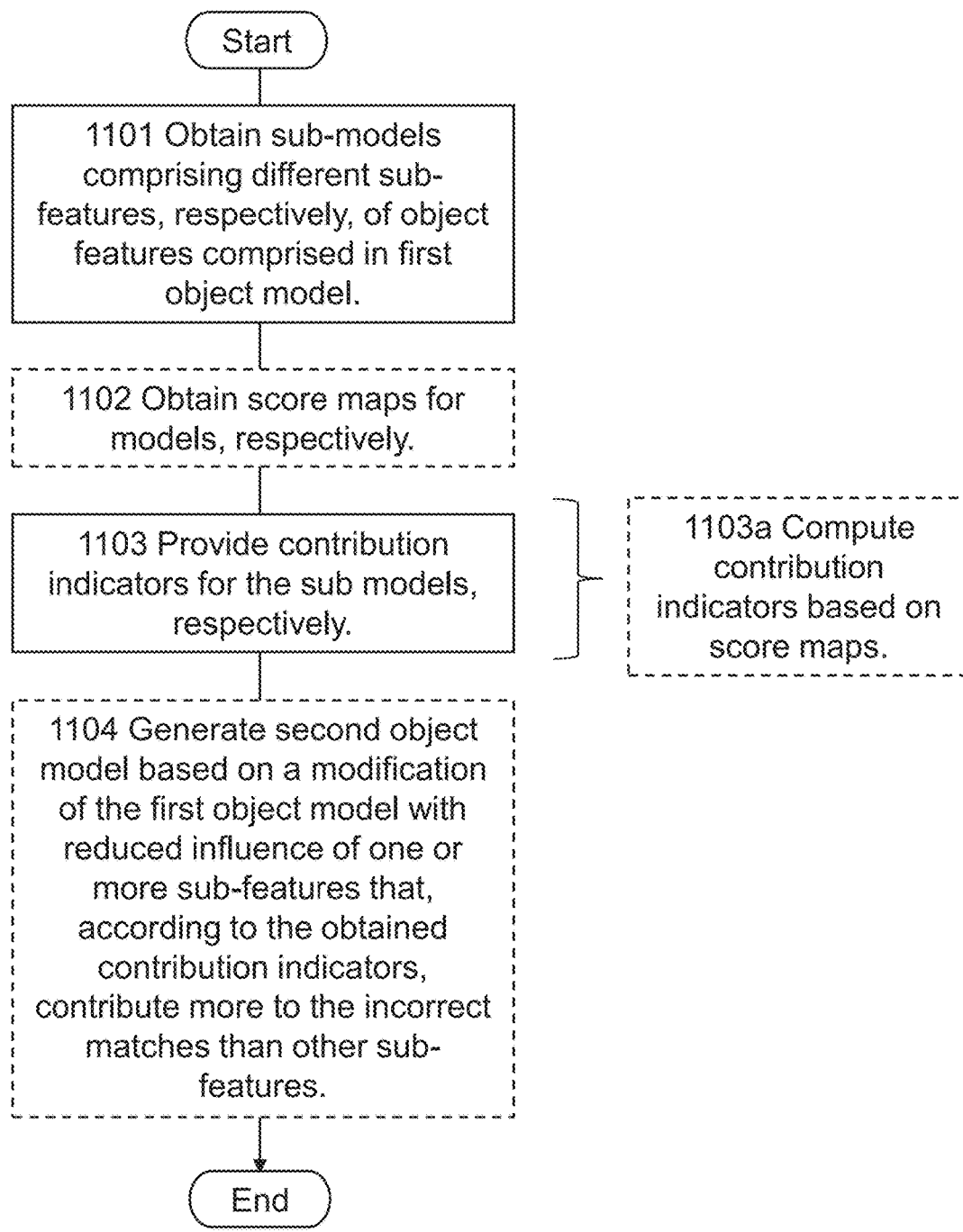
FIG. 11 is a flowchart schematically illustrating embodiments of a method according to embodiments herein.

FIG. 11 is a flowchart schematically illustrating embodiments of a method according to embodiments herein. The actions below, which may form the method, are for for supporting generation of a second object model, e.g. 480, based on a first object model, e.g. 420. The second object model, and the first object model, are for object matching according to an object matching algorithm, e.g. 450. The first object model comprises object features, e.g. 421-1 . . . 421-N, of an, typically extracted from, an imaged reference object, e.g. 411.

Note that the actions below may be taken in any suitable order and/or be carried out fully or partly overlapping in time when this is possible and suitable.

Action 1101

It is obtained sub-models, e.g. 425-1 . . . 425-N, that comprise different sub-features, e.g. 421-1 . . . 421-N, respectively, of said object features comprised in the first object model.

The object features may be extracted from at last one model teach image, e.g. 410, imaging the reference object. The object matching algorithm may be a conventional object matching algorithm based on matching an object model, here the first object model, with one or more images, e.g. live images, that may image an object to match with. For example, the object matching algorithm may be such based on forming score maps as described herein.

Said object features of the reference object are typically extracted from one or more model teach images imaging the reference object, each model teach image comprising an image of at least part of the reference object. The extraction may be performed according to some conventional method, e.g. for edge extraction when the features are edges.

Each sub-feature corresponds to one or more of the object features comprised by the first object model. The features of the total of sub-models preferably should contain all features of the first object model and/or an object feature should not be part of more than one sub-feature and thereby not be part of more than one sub-model, although this may not always be the case.

The sub-models may be obtained by being received from remote other device and/or obtained from some storage, or by being formed based on the first object model, e.g. based on extracted or selected object features therefrom.

Action 1102

It may be obtained, per MOI, score maps, e.g. 460, 465-1 . . . 465-N, comprising at least sub-model score maps, e.g. 465-1 . . . 465-N, for the sub-models, e.g. 425-1 . . . 425-N, respectively. Each score map may be based on matching, e.g. may result from matching, a corresponding model, e.g. 420; 425-*n,* at different poses with the MOI. Each score map should comprise scores at different positions, e.g. p1 . . . pK, of the score map. Each of said positions should be associated with one or more of said poses. The score of a position, e.g. pk, indicating a level of matching between said one or more of said poses of the model, e.g. 420; 425-*n,* associated with the position and the MOI.

Said score maps, obtained per MOI, may further comprise a first model score map, e.g. 460, for the first object model, e.g. 420.

Said different poses typically comprise different translations and/or rotations of the object model. The different poses may also involve different scaling of the object model. Each score of a score map may thus be considered a matching level indictor, typically in the form of a value, e.g. an integer number, indicating how well the pose in question matches with the MOI. A score in the form of an integer number may e.g. indicate how many pixels are matching between MOI and the model at the pose associated with the position.

Action 1103

It is provided, e.g. computed, contribution indicators, e.g. 475-1 . . . 475-N, for said sub-models, e.g. 425-1 . . . 425-N, respectively. Each contribution indicator, e.g. 475-*n,* of said contribution indicators indicates contribution of the sub-feature, e.g. 421-*n,* of the sub-model, e.g. 425-*n,* that the sub-feature is part of, to incorrect matches. The contribution indicators, e.g. 475-1 . . . 475-N, are based on matching, according to the object matching algorithm, the first object model, e.g. 420, and the sub-models, e.g. 425-1 . . . 425-N, with at least one model optimization image (MOI), e.g. 440. The MOI comprising predefined training features that when matched with the first object model, e.g. 420, results in at least said incorrect matches.

As used herein, an incorrect match is in general a false match, i.e. a match that results in that the object matching algorithm provides a result that corresponds to or can be interpreted as a match despite this is not correct, i.e. is an incorrect match, or in other words, is a false match. An incorrect match with a MOI may occur when the first object model, least according to some pose thereof, e.g. at some translation, rotation and/or scale, used in the matching with a MOI, is sufficiently near what the matching result would be in case of a correct match so that it is difficult or impossible to know if the result is a correct match or not from the matching result as such. Typically, this means that the incorrect match corresponds to a matching result that is within a predefined or predetermined range that covers also what a correct match could or would be within. Such range may be defined by a predefined or predetermined number(s) and/or a threshold. The score threshold mentioned herein is an example of such threshold.

The MOI(s) may e.g. image objects that are similar but not the same as the reference object, and/or may comprise combinations of objects and/or features that are known to and/or are likely to result in incorrect matches. In some embodiments the MOIs comprise one or more images of the reference object, or in general, one or more images that will result in also one or more correct matches.

The contribution indicators, as also explained elsewhere herein, are typically values or numbers. The contribution indicators may be obtained by being received and/or obtained from storage, or by being computed.

Said reduced influence of said one or more sub-features, e.g. 421-1, may comprise application of different sample densities in the second object model, e.g. 480. The different sample densities should be applied such that object features in the second object model that correspond to said one or more sub-features, e.g. 421-1, that contribute more to the incorrect matches than said other sub-features, e.g. 421-N, are formed by samples having lower sample density than samples forming object features in the second object model that correspond to said other sub-features, e.g. 421-N.

The samples may e.g. be pixels. Application of the different sample densities may involve removing and/or adding samples from/to the first object model. This may be the case of the first object model already comprises sampled object features, e.g. at a single or uniform sample density. In some embodiments, application of the different sample densities involves sampling features of the first object model at different sample densities, or sampling features of the first object model and then removing and/or adding samples.

Said at least one MOI, e.g. 440, may further comprise predefined training features 10 that when matched with the first object model, e.g. 420, result in one or more correct matches. Each contribution indicator, e.g. 475-$n$, should then indicate said contribution of the sub-feature, e.g. 421-$n$, of the sub-model, e.g. 425-$n$, to the incorrect matches in relation to contribution of the sub-feature of the sub-model to the correct matches. Each contribution indicator may here e.g. correspond to two values or numbers in relation to each other, one regarding incorrect matches and one regarding correct matches, or a single resulting number based on a computed difference or ratio based on said two values or numbers.

Action 1103a

In case of Action 1102, i.e. when this action is performed and score maps obtained, providing the contribution indicators of Action 1103, may comprise computing the contribution indicators, e.g. 475-1 . . . 475-N, based on said obtained score maps, e.g. 460, 465-1 . . . 465-N.

In some embodiments, the computation of each contribution indicator, e.g. 475-$n$, comprises computing, per MOI, a first sum, e.g. as in the denominator of Eq. 1 or the sum of Eq. 2. The terms of the first sum should comprises score, respectively, from at least positions of the sub-model score map that correspond to said incorrect matches.

Further, in some embodiments, the computation of each contribution indicator, e.g. 475-$n$, further comprises computing, per MOI, a second sum, e.g. as in the numerator of Eq. 1. The terms of the second sum should comprise scores, respectively, from one or more positions of the sub-model score map that correspond to correct matches. In these embodiments, the computation of each contribution indicator may be based on, per MOI, relating the first sum to the second sum, such as dividing the second sum with the first sum as in Eq. 1.

Further, in some embodiments, the terms of the first sum may comprise scores, respectively, from all positions of the sub-model score map except such that correspond to correct matches, if any.

In some embodiments, each of the terms of the first sum and also second sum if the second sum has been computed, comprises the score of the of the sub-model score map at a position corresponding to the term multiplied with a weight function, e.g. F, based on the score of the first model score map at the same position. The weight function should increases the score of the sub-model score map at positions corresponding to incorrect matches and correct matches, if any, in relation to the other terms. The weight function, e.g. F, should be exponentially increasing with the score of the first model score map. For example, the weight function may be the square of the score of the first model score map.

When said at least one MOI are multiple MOIs, said first sum per MOI, and also said second sum per MOI if the second sum has been computed, may be used to compute a sub indicator per MOI, wherein the computation of each contribution indicator comprises adding the sub indicators for all MOIs. Another option is to compute first sub-sums, one per MOI, each first sub-sum corresponding to the sum in the denominator in Eq. 1, and adding the first sub-sums to form a total first sum. Under this option, it should also be computed second sub-sums, one per MOI, each corresponding to the sum in the numerator in Eq. 1, and adding the second sub-sums to form a total second sum. The contribution indicator for the sub-model for all MOIs may then be based on relating the total first sum to the total second sum, e.g. dividing the first sum with the second sum.

Action 1104

In some embodiments, the second object model, e.g. 480, is generated based on a modification of the first object model, e.g. 420, with reduced influence of one or more sub-features, e.g. of 421-1, that, according to the provided contribution indicators, e.g. 475-1 . . . 475-N, contribute more to the incorrect matches than other sub-features, e.g. than 421-N. The reduced influence being in relation to said other sub-features, e.g. 421-N.

In other words, influence is reduced of sub-features that according to the contribution indictors contribute more to incorrect matches compared to sub-features that remain. The second object model will thus comprise object features that contribute less to incorrect matches compared to the first object model. Typically, it is desirable to reduce influence from sub-features that according to the contribution indicators contribute the most to incorrect matches. Reducing the influence of a sub-feature may in some embodiments comprise removing such sub-feature from the first object model or remove parts of it, e.g. sample such sub-feature more sparse or keep less samples of such sub-feature. In some embodiments it may be applied different weighting to sub-features according to their contribution indicators to accomplish said reduced influence.

The second object model will thus contribute less to incorrect matches and/or comparatively more to correct matches. The second object model may thereby not only enable more accurate results but also be a more efficient model that allows for faster implementation. In other words, provision of an improved object model for object matching is supported by embodiments herein The method and/or actions discussed above in relation to FIG. 11, are typically performed by one or more devices, e.g. computer(s) and/or hardware unit(s) with processing capability, e.g. general purpose computer(s) and/or hardware with processing capabilities that is at least partly dedicated and/or configured specifically for object matching use. In some embodiments, the method may be performed by distributed units, e.g. part of a machine vision system, and/or involving remote device(s), e.g. part of a remote computer network, e.g. a computer cloud. Action(s) of the method may then for example be performed as part of a cloud service. For example, the first object model, possibly also information on sub-models thereof to be used, may be uploaded from a first device to computer(s) that have access to suitable predefined MOI(s), and provides the contribution indicators, e.g. by computing them. The contribution indicators may then be provided, e.g. returned back, for use to generate the second object model, or the second object model as such is generated and returned back or provided to yet another device where it is to be applied.

Figure 12:
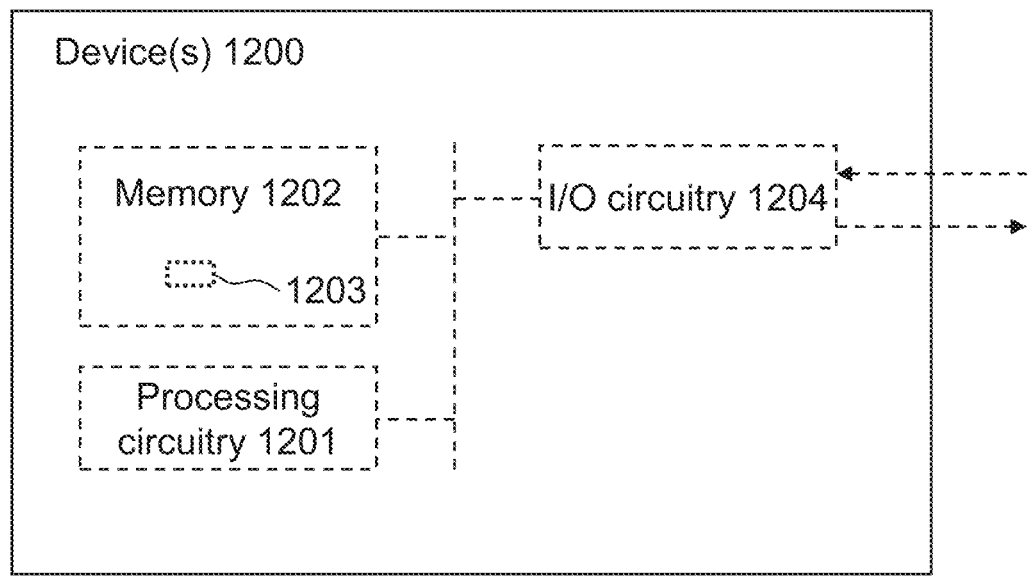
FIG. 12 is a functional block diagram for illustrating embodiments of one or more devices according to embodiments herein and how such can be configured to carry out the method and actions described in relation to FIG. 11.

FIG. 12 is a schematic block diagram for illustrating embodiments of one or more devices 1200 for performing the method and/or actions as discussed above, e.g. in relation to FIG. 11. The device(s) 1200 may correspond to or comprise computer(s) and/or hardware unit(s) with processing capability that e.g. may be dedicated and/or configured specifically for object matching use, e.g. be implemented as part of a camera unit involved in the object matching. In some embodiments the device(s) 1200 may correspond to or comprise a so called computer cloud or computer(s) thereof, e.g. when the method and actions, or part thereof, are executed by the such cloud or a cloud based service. In that case it is implied that the method or action is performed by at least one computer part of the cloud and for providing the cloud service, although the location of, and the involved computer(s), may be difficult or even impossible to identify. For example, a possible such implementation could involve uploading a first object model via the cloud service and then receive back the second object model, thus provided by the cloud service according to embodiments herein, or uploading the first object model and indicate sub-features or sub-models, and then in response receive contribution indicators for the these, which thus can be used to generate the second object model.

Hence, the device(s) 1200 may be for supporting generation of a second object model, e.g. 480, based on a first object model, e.g. 420, for object matching according to an object matching algorithm, e.g. 450. The first object model, e.g. 420, comprises object features, e.g. 421-1 . . . 421-N, of an imaged reference object, e.g. 411.

The device(s) 1200 may comprise at least one processing circuitry 1201 involved 10 in processing and e.g. encoding of signals and data, as exemplifying hardware module(s) and/or circuit(s), and may comprise or correspond to one or more processors or processing circuits.

The device(s) 1200 may further comprise at least one memory 1202 that may comprise, such as contain or store, at least one computer program 1203. The computer program(s) 1203 comprises 'instructions' or 'code' directly or indirectly executable by the device(s) 1200 to perform at least part of said method and/or actions. The memory 1202 may comprise one or more memory units and may further be arranged to store data, such as configurations, data and/or values, involved in or for performing functions and actions of embodiments herein. In some embodiments, the memory 1202 may comprise the computer program 1203 executable by the processing circuitry 1201, whereby the device(s) 1200 is operative, or configured, to perform said method and/or actions thereof.

The device(s) 1200, e.g. the processing circuitry 1201, may comprise at least one Input/Output (110) circuitry 1204, configured to be involved in, e.g. by performing, any communication to and/or from other units and/or devices, such as sending and/or receiving information to and/or from devices external to the device(s) 1200. The I/O circuitry(s) 1204 may be exemplified by obtaining, e.g. receiving, module(s) and/or providing, e.g. sending, module(s), when applicable.

Further, in some embodiments, the device(s) 1200, e.g. the processing circuitry 1201, comprises one or more of processing module(s), obtaining module(s), providing module(s), generating module(s) and computing module(s), as exemplifying hardware and/or software module(s) for carrying out actions of embodiments herein. These modules may be fully or partly implemented by the processing circuitry 1201.

Hence:

The device(s) 1200, and/or the processing circuitry 1201, and/or the I/O circuitry 35 1204, and/or the obtaining module(s), are operative, or configured, to, obtain said sub-models, e.g. 425-1 . . . 425-N, that comprise said different sub-features, e.g. 421-1 . . . 421-N, respectively, of said object features, e.g. 421-1 . . . 421-N, comprised in the first object model, e.g. 420.

The device(s) 1200, and/or the processing circuitry 1201, and/or the I/O circuitry 1204, and/or the providing module(s), are further operative, or configured, to, provide, e.g. compute, said contribution indicators, e.g. 475-1 . . . 475-N, for the sub-models, e.g. 425-1 . . . 425-N, respectively.

Further, in some embodiments, the device(s) 1200, and/or the processing circuitry 1201, and/or the generating module(s) are further operative, or configured, to, generate the second object model, e.g. 480, based on said modification of the first object model, e.g. 420, with the reduced influence of one or more sub-features, e.g. 421-1, that, according to the provided contribution indicators, e.g. 475-1 . . . 475-N, contribute more to the incorrect matches than other sub-features, e.g. 421-N, with said reduced influence being in relation to said other sub-features, e.g. 421-N.

Moreover, in some embodiments, the device(s) 1200, and/or the processing circuitry 1201, and/or the I/O circuitry 1204, and/or the obtaining module(s), are further operative, or configured, to obtain, per MOI, e.g. 440, said score maps, e.g. 460, 465-1 . . . 465-N, comprising at least said sub-model score maps, e.g. 465-1 . . . 465-N, for the sub-models, e.g. 425-1 . . . 425-N, respectively. In these embodiments, the device(s) 1200, and/or the processing circuitry 1201, and/or the I/O circuitry 1204, and/or the computing module(s), are operative, or configured, to, compute the contribution indicators, e.g. 475-1 . . . 475-N, based on said obtained score maps, e.g. 460, 465-1 . . . 465-N.

Figure 13:
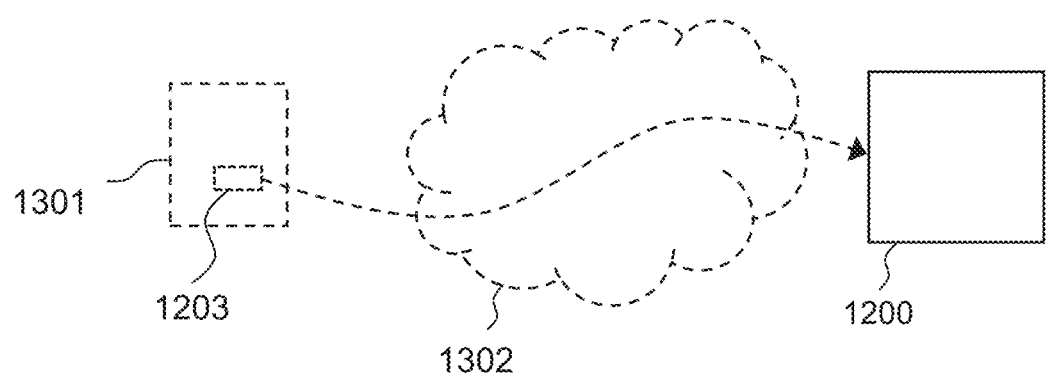
FIG. 13 is a schematic drawing illustrating embodiments relating to a computer program, and carriers thereof, to cause said one or more devices to perform the method and actions described in relation to FIG. 11.

FIG. 13 is a schematic drawing illustrating some embodiments relating to one or more computer programs and carriers thereof to cause said device(s) 1200 discussed above to perform said method and actions described in relation to FIG. 11.

The computer program(s) may be the computer program 1203 and comprises instructions that when executed by the processing circuitry 1201 and/or the processing module(s), cause the device(s) 1200 to perform as described above. In some embodiments there is provided one or more carriers, or more specifically data carrier(s), e.g. computer program product(s), comprising the computer program(s) 1203. The carrier, or each one of said carriers, may be one of electronic signal(s), optical signal(s), radio signal(s), and a computer readable storage medium or media, e.g. a computer readable storage medium or media 1301 as schematically illustrated in the figure. The computer program(s) 1203 may thus be stored on the computer readable storage medium or media 1301. By carrier may be excluded a transitory, propagating signal and the data carrier may correspondingly be named non-transitory data carrier. Non-limiting examples of data carrier(s) being a computer readable storage medium is a memory card or a memory stick, a disc storage medium such as a CD or DVD, or a mass storage device that typically is based on hard drive(s) or Solid State Drive(s) (SSD). The computer readable storage medium or media 1301 may be used for storing data accessible over a computer network 1302, e.g. the Internet or a Local Area Network (LAN). The computer program(s) 1303 may furthermore be provided as pure computer program(s) or comprised in a file or files. The file(s) may be stored on the computer readable storage medium or media 1301 and e.g. available through download e.g. over the computer network 1302 as indicated in the figure, e.g. via a server. The server may e.g. be a web or File Transfer Protocol (FTP) server. The file or files may e.g. be executable files for direct or indirect download to and execution on said device(s) to make it perform as described above, e.g. by execution by the processing circuitry 1201. The file or files may also or alternatively be for intermediate download and compilation involving the same or another processor(s) to make them executable before further download and execution causing said device(s) 1200 to perform as described above.

Note that any processing module(s) and circuit(s) mentioned in the foregoing may be implemented as a software and/or hardware module, e.g. in existing hardware and/or as an Application Specific Integrated Circuit (ASIC), a Field-Programmable Gate Array (FPGA) or the like. Also note that any hardware module(s) and/or circuit(s) mentioned in the foregoing may e.g. be included in a single ASIC or FPGA, or be distributed among several separate hardware components, whether individually packaged or assembled into a System-on-a-Chip (SoC).

Those skilled in the art will also appreciate that the modules and circuitry discussed herein may refer to a combination of hardware modules, software modules, analogue and digital circuits, and/or one or more processors configured with software and/or firmware, e.g. stored in memory, that, when executed by the one or more processors may make the device(s), sensor(s) etc. to be configured to and/or to perform the above-described methods and actions.

Identification by any identifier herein may be implicit or explicit. The identification may be unique in a certain context, e.g. for a certain computer program or program provider.

As used herein, the term "memory" may refer to a data memory for storing digital information, typically a hard disk, a magnetic storage, medium, a portable computer diskette or disc, flash memory, Random Access Memory (RAM) or the like. Furthermore, the memory may be an internal register memory of a processor.

Also note that any enumerating terminology such as first value, second value, first device, second device etc., should as such be considered non-limiting and the terminology as such does not imply a certain hierarchical relation. Without any explicit information in the contrary, naming by enumeration should be considered merely a way of accomplishing different names.

As used herein, the terms "number" or "value" may in general refer to any kind of digit, such as binary, real, imaginary or rational number or the like. Moreover, "number" or "value" may be one or more characters, such as a letter or a string of letters. Also, "number" or "value" may be represented by a bit string.

As used herein, the expression "configured to" may mean that a processing circuit is configured to, or adapted to, by means of software or hardware configuration, perform one or more of the actions described herein.

As used herein, the expression "may" and "in some embodiments" has typically been used to indicate that the features described may be combined with any other embodiment disclosed herein.

In the drawings, features that may be present in only some embodiments are typically drawn using dotted or dashed lines.

When using the word "comprise" or "comprising" it shall be interpreted as nonlimiting, i.e. meaning "consist at least of".

The embodiments herein are not limited to the above described embodiments, Various alternatives, modifications and equivalents may be used. Therefore, the above embodiments should not be taken as limiting the scope of the present disclosure, which is defined by the appending claims.

The invention claimed is:

1. Method, performed by one or more devices, for supporting generation of a second object model, based on a first object model, for object matching according to an object matching algorithm, the first object model comprising object features of an imaged reference object, wherein the method comprises:
   obtaining sub-models that comprise different sub-features, respectively, of said object features comprised in the first object model, and
   providing contribution indicators for the sub-models, respectively, each contribution indicator of said contribution indicators indicating contribution of the sub-feature of the sub-model to incorrect matches, the contribution indicators being based on matching, according to the object matching algorithm, the first object model and the sub-models with at least one model optimization image, "MOI", comprising predefined training features that when matched with the first object model result in at least said incorrect matches,
   obtaining, per MOI, score maps comprising at least sub-model score maps for the sub-models, respectively, each score map being based on matching a corresponding model at different poses with the MOI, each score map comprising scores at different positions of the score map, each of said positions being associated with one or more of said poses, the score of a position indicating a level of matching between said one or more of said poses of the model associated with the position and the MOI,
   wherein said provision of the contribution indicators comprises computing the contribution indicators based on said obtained score maps, wherein said score maps, obtained per MOI, further comprises a first model score map for the first object model, and
   wherein the computation of each contribution indicator comprises computing, per MOI, a first sum, wherein the terms of the first sum comprise scores, respectively, from at least positions of the sub-model score map that correspond to said incorrect matches.

2. The method as claimed in claim 1, wherein the method further comprises:
   generating the second object model based on a modification of the first object model with reduced influence of one or more sub-features that, according to the provided contribution indicators, contribute more to the incorrect matches than other sub-features, said reduced influence being in relation to said other sub-features.

3. The method as claimed in claim 2, wherein said reduced influence of said one or more sub-features comprises application of different sample densities in the second object model, such that object features in the second object model that correspond to said one or more sub-features, that contribute more to the incorrect matches than said other sub-features, are formed by samples having lower sample density than samples forming object features in the second object model that correspond to said other sub-features.

4. The method as claimed in claim 1, wherein said at least one MOI further comprises predefined training features that when matched with the first object model result in one or more correct matches, and wherein each contribution indicator indicates said contribution of the sub-feature of the sub-model to the incorrect matches in relation to contribution of the sub-feature of the sub-model to the correct matches.

5. The method as claimed in claim 1, wherein the computation of each contribution indicator, further comprises computing, per MOI, a second sum, wherein the terms of the second sum comprises scores, respectively, from one or more positions of the sub-model score map that correspond to correct matches.

6. The method as claimed in claim 5, wherein the computation of each contribution indicator is based on, per MOI, relating the first sum to the second sum.

7. The method as claimed in claim 1, wherein the terms of the first sum comprise scores, respectively, from all positions of the sub-model score map except such that correspond to correct matches, if any.

8. The method as claimed in claim 7, wherein each of the terms of the first sum and also second sum if the second sum has been computed, comprises the score of the of the sub-model score map at a position corresponding to the term multiplied with a weight function based on the score of the first model score map at the same position, which weight function increases the score of the sub-model score map at positions corresponding to incorrect matches and correct matches, if any, in relation to the other terms.

9. The method as claimed in claim 8, wherein the weight function is exponentially increasing with the score of the first model score map.

10. One or more devices for supporting generation of a second object model based on a first object model for object matching according to an object matching algorithm, the first object model comprising object features of an imaged reference object, wherein said one or more devices are configured to:
   obtain sub-models that comprise different sub-features, respectively, of said
   object features comprised in the first object model,
   provide contribution indicators for the sub-models, respectively, each contribution indicator of said contribution indicators indicating contribution of the sub-feature of the sub-model to incorrect matches, the contribution indicators being based on matching, according to the object matching algorithm, the first object model and the sub-models with at least one model optimization image, "MOI", comprising predefined training features that when matched with the first object model result in at least said incorrect matches, and
   obtain, per MOI, score maps comprising at least sub-model score maps for the sub-models, respectively, each score map being based on matching a corresponding model at different poses with the MOI, each score map comprising scores at different positions of the score map, each of said positions being associated with one or more of said poses, the score of a position indicating a level of matching between said one or more of said poses of the model associated with the position and the MOI,
   wherein said provision of the contribution indicators comprises computing the contribution indicators based on said obtained score maps, wherein said score maps, obtained per MOI, further comprises a first model score map for the first object model, and
   wherein the computation of each contribution indicator comprises computing, per MOI, a first sum, wherein the terms of the first sum comprise scores, respectively, from at least positions of the sub-model score map that correspond to said incorrect matches.

11. A non-transitory computer readable medium having stored therein one or more computer programs comprising instructions that when executed by said one or more devices causes the one or more devices to perform the method according to claim 1.

* * * * *